US012771889B2

(12) United States Patent
Tsugii

(10) Patent No.: US 12,771,889 B2
(45) Date of Patent: Oct. 20, 2026

(54) SOCIAL TIPPING MANAGEMENT SYSTEM

(71) Applicant: Kaori Tsugii, Izumi (JP)

(72) Inventor: Takehiro Tsugii, Izumi (JP)

(73) Assignee: Kaori Tsugii, Izumi (JP)

( * ) Notice: Subject to any disclaimer, the term of this patent is extended or adjusted under 35 U.S.C. 154(b) by 0 days.

(21) Appl. No.: 18/861,876

(22) PCT Filed: May 18, 2023

(86) PCT No.: PCT/JP2023/018534
§ 371 (c)(1),
(2) Date: Oct. 31, 2024

(87) PCT Pub. No.: WO2023/228849
PCT Pub. Date: Nov. 30, 2023

(65) Prior Publication Data
US 2025/0113074 A1 Apr. 3, 2025

(30) Foreign Application Priority Data
May 25, 2022 (JP) ................................ 2022-084913

(51) Int. Cl.
*H04N 21/254* (2011.01)
*H04N 21/239* (2011.01)
(Continued)

(52) U.S. Cl.
CPC ....... *H04N 21/254* (2013.01); *H04N 21/2393* (2013.01); *H04N 21/4316* (2013.01); *H04N 21/4725* (2013.01); *H04N 21/6175* (2013.01)

(58) Field of Classification Search
None
See application file for complete search history.

(56) References Cited

U.S. PATENT DOCUMENTS 8,849,945 B1 * 9/2014 Desjardins ............ G11B 27/34 725/35
10,616,666 B1 * 4/2020 Pontiff ............... H04N 21/8545
(Continued)

FOREIGN PATENT DOCUMENTS

JP 2020-167526 A 10/2020
JP 2021-010181 A 1/2021
(Continued)

OTHER PUBLICATIONS

International Search Report for PCT/JP2023/018534 dated Aug. 1, 2023.
(Continued)

*Primary Examiner* — Mushfikh I Alam
(74) *Attorney, Agent, or Firm* — Yokoi & Co., U.S.A.; Toshiyuki Yokoi

(57) ABSTRACT

In a tipping management system 10 for allowing viewers to give a tip to program performers of digital television broadcasting, data broadcasting content to be displayed on a television 2 when a digital television broadcasting program is displayed on the television 2 includes information for the viewer to give the tip. The social tipping management system 10 comprises a data broadcasting creation server for creating the data broadcasting content including information for giving the tip, and a management server 1 for receiving tip data via an Internet line when the viewer gives the tip based on the information for giving the tip included in the data broadcasting content, and determining the amount of money to be distributed to the program performer.

8 Claims, 7 Drawing Sheets

(51) Int. Cl.

| | |
|---|---|
| ***H04N 21/431*** | (2011.01) |
| ***H04N 21/4725*** | (2011.01) |
| ***H04N 21/61*** | (2011.01) |

(56) References Cited

U.S. PATENT DOCUMENTS

| | | | | |
|---|---|---|---|---|
| 11,109,107 | B2 * | 8/2021 | Kiyooka | G06Q 30/0222 |
| 11,800,191 | B1 * | 10/2023 | Liu | A61H 19/00 |
| 12,340,661 | B2 * | 6/2025 | Pasley | G07F 17/3258 |
| 2014/0082647 | A1 * | 3/2014 | Verrilli | H04N 21/44204 725/14 |
| 2014/0244435 | A1 * | 8/2014 | Yahata | H04N 21/2543 705/26.8 |
| 2017/0006322 | A1 * | 1/2017 | Dury | H04N 21/254 |
| 2018/0234708 | A1 * | 8/2018 | Chong | H04N 21/472 |
| 2018/0260796 | A1 * | 9/2018 | McDonald | H04L 65/60 |
| 2018/0270541 | A1 * | 9/2018 | Chen | H04N 21/482 |
| 2019/0026793 | A1 * | 1/2019 | Rollon | G06T 19/003 |
| 2020/0286119 | A1 * | 9/2020 | Sullivan | G06Q 30/0242 |
| 2020/0351560 | A1 * | 11/2020 | Kiyooka | H04N 21/4784 |
| 2021/0248854 | A1 * | 8/2021 | Brown | G06F 21/6227 |
| 2021/0250653 | A1 * | 8/2021 | Kawakami | G06Q 50/10 |
| 2021/0256498 | A1 * | 8/2021 | DeTitta | G06Q 20/3276 |
| 2021/0279759 | A1 * | 9/2021 | Lee | G06Q 30/0235 |
| 2021/0306680 | A1 * | 9/2021 | Yuan | H04N 21/25891 |
| 2022/0070504 | A1 * | 3/2022 | Hartnett | H04N 21/21805 |
| 2022/0237842 | A1 * | 7/2022 | Liu | H04N 21/47805 |
| 2022/0345782 | A1 * | 10/2022 | Kojima | H04N 21/6581 |
| 2023/0353831 | A1 * | 11/2023 | Kino | G06Q 20/14 |
| 2023/0376998 | A1 * | 11/2023 | Pranger | H04L 9/3213 |
| 2023/0388604 | A1 * | 11/2023 | Yang | H04N 21/2187 |
| 2024/0314454 | A1 * | 9/2024 | Nakai | H04N 23/90 |

FOREIGN PATENT DOCUMENTS

| | | | |
|---|---|---|---|
| JP | 2021-096752 | A | 6/2021 |
| JP | 2022-011069 | A | 1/2022 |
| JP | 2022-013933 | A | 1/2022 |
| KR | 10-2017-0004104 | A | 1/2017 |

OTHER PUBLICATIONS

PCT written opinion dated Aug. 1, 2023.

Japanese Notice of Reasons for Refusal dated Sep. 13, 2022.

Japanese decision to grant a patent dated Feb. 14, 2023.

"BS TV Tokyo and KDDI. Conducting a trial toward the creation of a new viewing experience for TV.—Utilizing gifting and emotion analysis with startup in live broadcast-", pp. 1-2, retrieval date: Jul. 18, 2023, https://www.bs-tvtokyo.co.jp/company/press/pdf/20200316.pdf.

Australian Examination report dated Nov. 26, 2024.

Korean Office Action dated Apr. 23, 2025.

GetFans Team, "What is YouTube Super Chat And How To Make Money Using It", published on Internet on Feb. 25, 2021 as per WayBack Machine [online] [retrieved from Internet on Nov. 25, 2024] <URL: https://mashable.com/article/youtube-super-chat>.

Matt Binder, "Super Thanks: how to tip your favorite video creator on YouTube—A brand new way for YouTubers to monetize their content", published on Internet on May 9, 2022 as per WayBack Machine [online] [retrieved from Internet on Nov. 25, 2024] <URL: https://mashable.com/article/youtube-super-thanks>.

* cited by examiner

SOCIAL TIPPING MANAGEMENT SYSTEM

TECHNICAL FIELD

The present invention relates to a social tipping management system for allowing viewers to give a tip to performers of digital television broadcasting programs.

BACKGROUND OF THE INVENTION

Services that distribute videos via Internet lines are well known. There are also known services that allow viewers to give the tip to performers in videos distributed via Internet lines.

Patent Document 1 discloses an event management server that, in a competition event in which a plurality of competitors compete against each other, obtains purchase information of products associated with the competitors from a terminal used by a spectator of the competition event, and increases the tentative prize money of the competitors based on the sales amount of the associated products. Patent Document 1 also discloses that when the spectator gives money to a competitor, the event management server calculates the total amount of money and adds it to the prize money for each competitor.

PRIOR ART DOCUMENTS

Patent Documents

Patent Document 1: Japanese Laid-Open Patent Publication No. 2022-11069

SUMMARY OF THE INVENTION

Problem to Be Solved by the Invention

In the event management server described in Patent Document 1, video images are distributed via the Internet line. Therefore, while watching the video on the terminal such as a smart phone, the viewer can easily give the tip to the performer in the video via the Internet line by using a tip function prepared in advance.

On the other hand, since digital television broadcasting is a service in which images are delivered unilaterally to the viewer, it is not easy for viewers watching a program on a television to give the tip to the program performers.

An object of the present invention is to solve the above problems, and to provide a social tipping management system for allowing viewers to easily give the tip to performers of digital television broadcasting programs.

Means for Solving the Problem

The social tipping management system of the present invention for allowing viewers to give the tip to program performers of digital television broadcasting, wherein data broadcasting content to be displayed on the television when the digital television broadcasting program is displayed on the television includes information for the viewer to give the tip;

the social tipping management system comprising:

a data broadcasting creation server for creating the data broadcasting content including information for giving the tip; and a management server for receiving the tip data via an Internet line when the viewer gives the tip based on the information for giving the tip included in the data broadcasting content, and determining the amount of money to be distributed to the program performer.

Effect of the Invention

According to the social tipping management system of the present invention, when the viewer is watching a program displayed on the television and presses a d button on a remote control to display a data broadcast, for example, information for the viewer to give the tip is displayed, so the viewer can easily give the tip based on the displayed information for giving the tip.

MODES FOR CARRYING OUT THE INVENTION

The features of the present invention will be specifically described below by showing embodiments of the present invention.

First Embodiment

The social tipping management system of the present invention is a system that allows viewers to easily give the tip to the program performers during the broadcast of the digital television broadcasting program.

Figure 1:
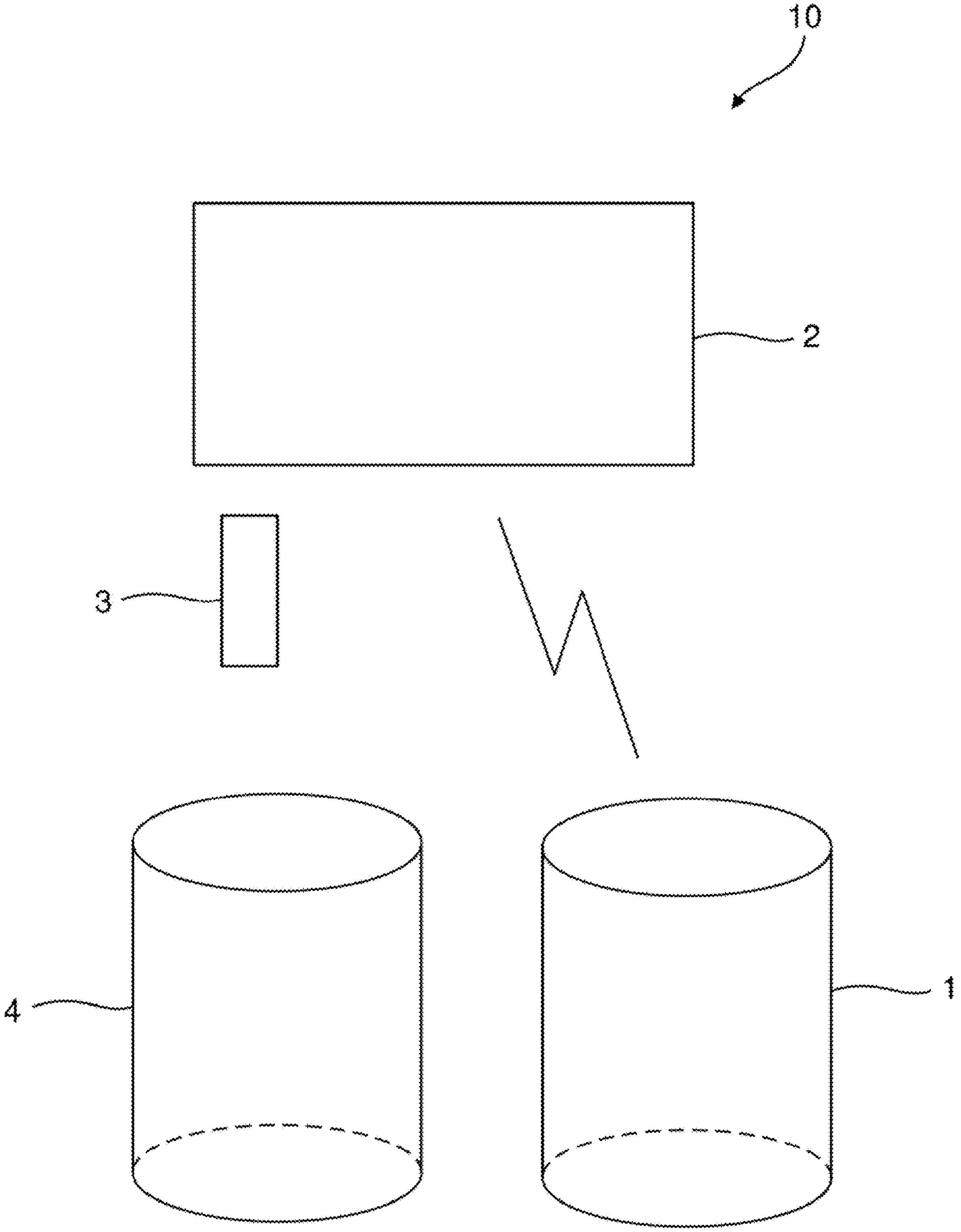
FIG. 1 is a diagram schematically showing the configuration of the social tipping management system according to a first embodiment.

FIG. 1 is a diagram schematically showing the configuration of the social tipping management system 10 according to the first embodiment. The social tipping management system 10 according to the first embodiment comprises a management server 1 and a data broadcasting creation server 4. The management server 1 can receive data from a television 2 via the Internet line.

The television 2 receives and displays digital television broadcasting. Digital television broadcasting includes, for example, terrestrial digital broadcasting, BS digital broadcasting, and CS digital broadcasting. The television 2 may be any device as long as it is capable of receiving digital television broadcasting and data broadcasting and is connectable to the Internet line. For example, the television 2 may be a generally commercially available stationary television, a portable television that can be carried around, a smartphone, a tablet, or PC equipped with a tuner to receive digital television broadcasting or capable of receiving one-segment broadcasting, etc.

Digital television broadcasting is one-way communication. On the other hand, data broadcasting allows two-way communication via the Internet line. In Japan, the name of broadcasting capable of two-way communication is "data broadcasting," but in other countries it may have a different name. Therefore, "data broadcasting" in this specification can be called "two-way communication broadcasting", for example.

The data broadcasting creation server 4 creates data broadcasting content including information for viewers to give the tip. The details of the data broadcasting content will be described later. The data broadcasting content created by the data broadcasting creation server 4 is transmitted together with the program content of the digital television broadcasting as radio waves from, for example, a broadcasting station. When the data broadcasting is called two-way communication broadcasting, the data broadcasting creation server 4 can be called a two-way communication broadcasting creation server 4.

Figure 2:
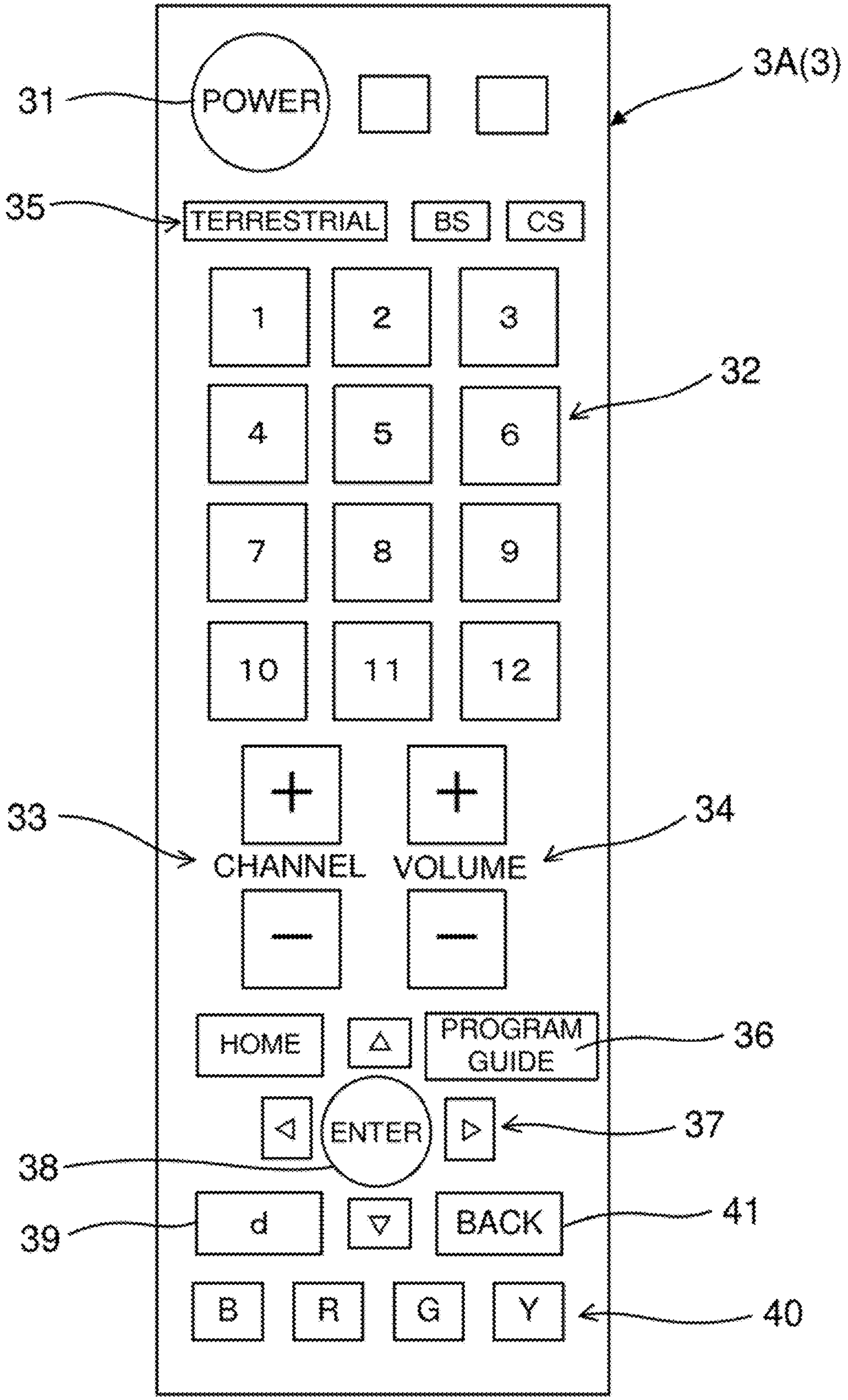
FIG. 2 is a plan view schematically showing an example of a remote control as the terminal.

The television 2 can be operated by a terminal 3. The terminal 3 is, for example, a remote control attached to the purchased television 2. FIG. 2 is a plan view schematically showing an example of a remote control 3A as the terminal 3. As shown in FIG. 2, the remote control 3A includes various buttons such as a power button 31 for turning on/off the power of the television 2, numeric buttons 32, channel change buttons 33 for changing the program to be displayed, volume change buttons 34 for changing the volume, a broadcast type change button 35 for displaying terrestrial broadcasting, BS broadcasting, and CS broadcasting respectively, a program guide button 36 for displaying an electronic program guide, up/down/left/right arrow buttons 37, an enter button 38, a d button 39 for displaying the data broadcasting, four color (blue, red, green, and yellow) buttons 40, and a back button 41 for performing operations such as returning to the previous screen.

However, the terminal 3 may be of any type as long as it can operate the television 2, and is not limited to the remote control attached to the television 2 at the time of purchase. For example, the terminal 3 may be a general-purpose remote control that is sold at electronics retailers and compatible with televisions of various manufacturers and models, or a smartphone installed with a remote control application capable of operating the television 2.

As will be described later, the viewer of the digital television broadcasting can give the tip to the program performer by operating the terminal 3 while watching the digital television broadcasting program. However, the tipping may be performed not only during the broadcast of the program but also before or after the broadcast of the program. Programs in which the tipping is possible may be arbitrary programs such as sports programs, variety show programs, news programs, song programs, animation programs, and porno programs. Also, the programs in which the tipping is possible may include a program specializing in tipping. The program specializing in tipping is, for example, a program in which performers seeking for the tip appear. Performers who seek for the tip acquire the tip from viewers by, for example, performing a performance such as singing a song or performing an art.

The money presented to the program performers by tipping may be real money, or may be something equivalent to money, such as virtual currency, electronic money, currency or coins that can be used in certain regions or systems, or points that can be exchanged for money.

The program performers to be tipped are people or characters that appear in the program, regardless of whether they wish to do so. For example, if the program is a song program, the performers include singers, and if the program is a sports match program such as rugby or martial arts, the performers include athletes. However, the program performer to be tipped is not limited to a person, and may be a character such as a mascot character or an animation character appearing in an animation program. In addition, in the case of a news program about a deceased person or a program in which the deceased person has appeared in the past, the program performers to be tipped include the deceased person. In this case, the bereaved family members or related parties of the deceased person can be the recipients of the tip. Furthermore, the tipping may be performed not only to the program performers but also to various stores such as restaurants, hospitals, companies, groups, organizations, etc. broadcasted in the program. It is also possible that the tipping may be performed only to various stores such as restaurants, hospitals, companies, groups, organizations, etc. broadcasted in the program.

The management server 1 receives the tip data via the Internet line when the viewer gives the tip by the method described later, and determines the amount of money to be distributed to the program performers.

The method by which viewers tip the program performers of digital television broadcasting is described in detail below.

In the social tipping management system 10 of the present invention, when the digital television broadcasting program is being displayed on the television 2, the content of the data broadcasting displayed on the television 2 is configured to include information for the viewer to give the tip. The data broadcasting can be displayed on the television 2 by the viewer, for example, pressing the d button 39 on the remote control 3A.

Figure 3:
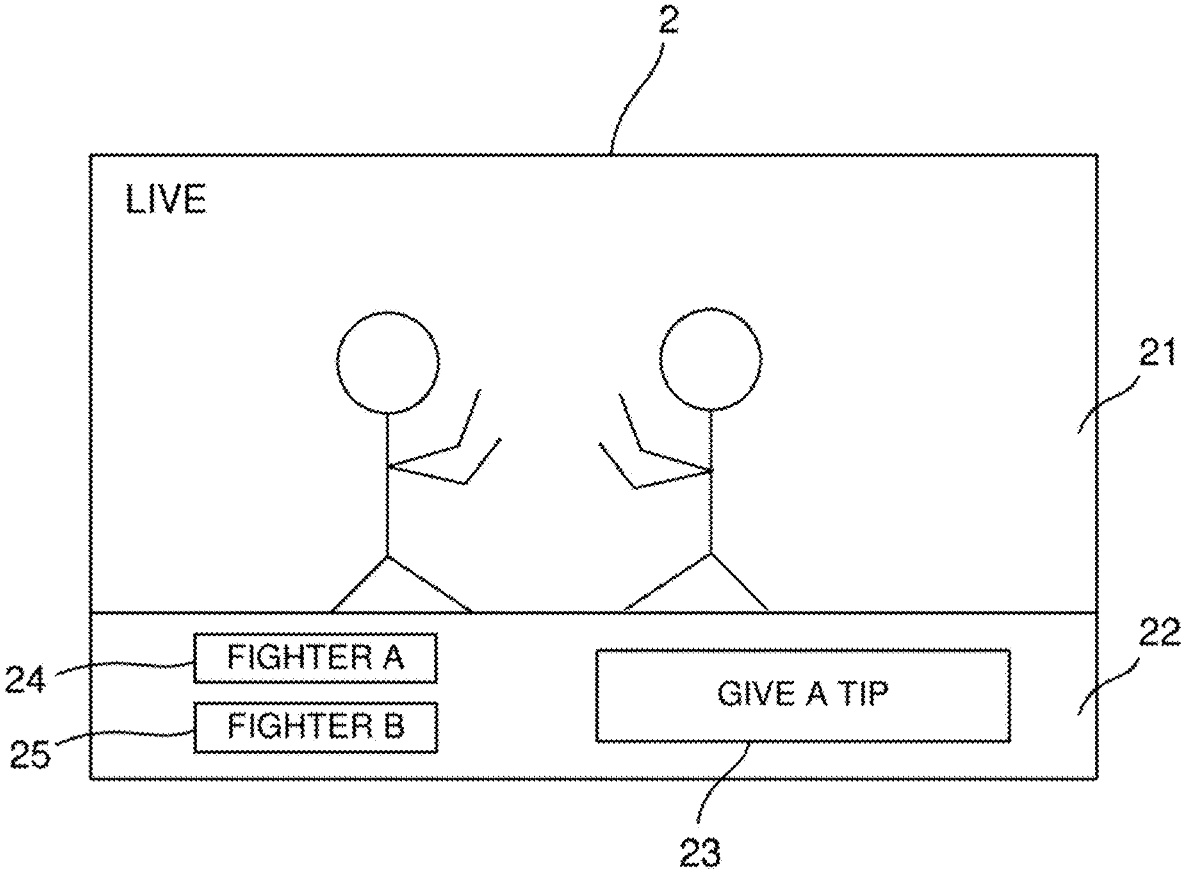
FIG. 3 is a diagram showing an example of a display screen of the television when the viewer presses the d button during display of the digital television broadcasting program.

FIG. 3 is a diagram showing an example of the display screen of the television 2 when the viewer presses the d button 39 on the remote control 3A during display of the digital television broadcasting program. As shown in FIG. 3, the television 2 displays the content 22 of the data broadcasting created by the data broadcasting creation server 4, along with the video 21 of the program being viewed. In the example shown in FIG. 3, the content 22 of the data broadcasting is displayed below the video 21 of a martial arts match between two martial artists, but the position of the display area of the data broadcasting is arbitrary. Here, the area of the display screen of the television 2 in which the data broadcasting content created by the data broadcasting creation server 4 is displayed is called the data broadcasting display area. The data broadcasting display area is configured to display at least information for giving the tip.

"Information for viewers to give the tip" included in the data broadcasting content is information that allows viewers to give the tip to the program performers. All information for the viewer to give the tip may be displayed at once in the data broadcasting display area, or it may be displayed in a hierarchical manner, as described below. As an example, as shown in FIG. 3, a button 23 labeled "give a tip" is displayed in order to display information for giving the tip in the data broadcasting display area in a hierarchical manner. As will be described later, when the viewer operates the terminal 3 to click the button 23 labeled "give a tip", the screen for giving the tip is displayed.

At this time, the data broadcasting display area may be used to display information about the program performers for which the tip is to be given. For example, during the broadcast of the program of a martial arts match, information about the fighters who are performing the match may be displayed in the data broadcasting display area. In the example shown in FIG. 3, a button 24 that allows the viewer to check information on fighter A, who is performing a martial arts match in the program image 21, and a button 25 that allows the viewer to check information on fighter B are displayed. When the viewer selects the button 24 for "Fighter A" by, for example, operating the arrow buttons 37 on the remote control 3A, and then presses the enter button 38 on the remote control 3A, information on Fighter A is displayed in the data broadcasting display area. In addition to the information for giving the tip, any other information can be displayed in the data broadcasting display area.

It should be noted that the contents of the data broadcasting including the information for giving the tip may be automatically displayed on the television 2 at least once during the broadcast of the digital television broadcasting program. In this case, it is possible to inform viewers who do not know that they can give the tip to the program performers from the screen of the data broadcasting that they can give the tip. In addition, it is possible to activate the tipping by the viewer by automatically displaying the data broadcasting containing the information for giving the tip. In this case, the automatically displayed data broadcasting may disappear when the viewer presses the d button 39 on the remote control 3A, or may disappear automatically after a certain period of time.

Figure 4:
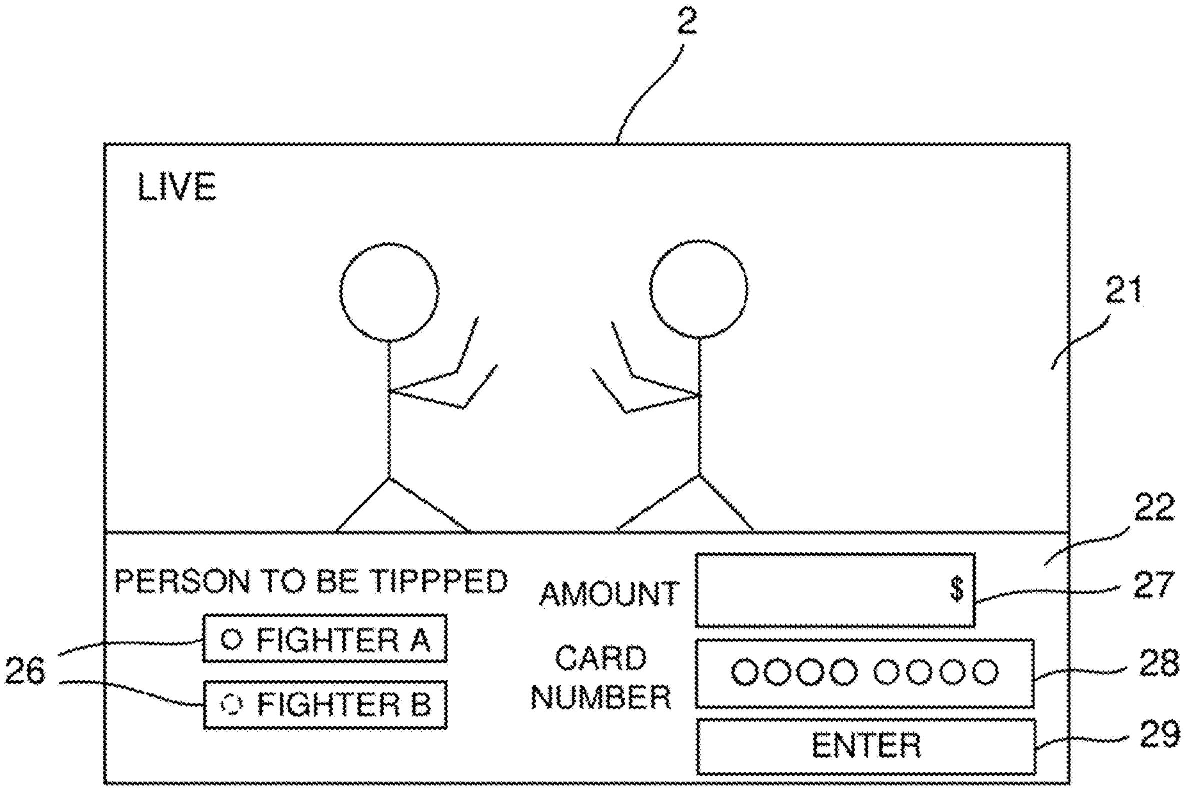
FIG. 4 is a diagram showing an example of the display screen when a screen for giving the tip is displayed in a data broadcasting display area while the digital television broadcasting program is being displayed on the television.

When the screen displayed on the television 2 is as shown in FIG. 3, if the viewer presses the button 23 labeled "give a tip" by, for example, operating the arrow buttons 37 on the remote control 3A and presses the enter button 38 on the remote control 3A, a screen for giving the tip is displayed in the data broadcasting display area, as shown in FIG. 4. However, the screen for giving the tip shown in FIG. 4 is just an example.

The data broadcasting display area is configured to show fields for selecting or inputting at least a person to be tipped and the amount of the tip. In the display example shown in FIG. 4, a field 26 for selecting the person to be tipped, a field 27 for inputting the amount of the tip, and a field 28 for entering the credit card number to be used when paying the tip are displayed.

In the display example shown in FIG. 4, it is possible to select either "fighter A" or "fighter B", who are performing a martial arts match in the image 21 of the program, as the person to be tipped. The viewer, for example, operates the arrow buttons 37 on the remote control 3A to select either "fighter A" or "fighter B" in the field 26 for selecting the person to be tipped, and then presses the enter button 38. Also, the viewer operates the arrow buttons 37 on the remote control 3A to select the field 27 for inputting the amount of the tip, and operates the numeric buttons 32 on the remote control 3A to input the amount of the tip. For example, a predetermined amount of money may be displayed in the data broadcasting display area, such as 500 yen, 1,000 yen, 5,000 yen, 10,000 yen, etc., so that the viewer can select one of the amounts.

Also, the viewer selects the credit card number field 28 by operating the arrow buttons 37 on the remote control 3A or by other means, and enters the number of the credit card to be used to give the tip by operating the numeric buttons 32 on the remote control 3A or by other means. In the example shown in FIG. 4, only the credit card number is entered, but the user may be asked to enter the security number associated with the credit card as well, or the name of the credit card holder may also be asked.

In addition, in order to use the social tipping management system 10 of the present invention, the user may be able to register in advance information of the credit card to be used to pay the tip, or may be able to register in advance information of the bank account from which the money for the tip will be withdrawn, and when giving the tip, payment may be made by a pre-registered credit card or withdrawal may be made from a pre-registered bank account. For example, the social tipping management system 10 comprises a storage server (not shown), and credit card information or bank account information registered in advance by the viewer are registered in the storage server. In this case, the viewer does not need to input information such as credit card number every time he or she gives the tip, which improves convenience.

Finally, the viewer selects the enter button 29 displayed in the data broadcasting display area by operating the arrow buttons 37 on the remote control 3A or by other means, and presses the enter button 38 on the remote control 3A to give the tip to the selected program performer. The tip data selected and/or input by the viewer is transmitted to the management server 1 via the Internet line by the interactive function of the data broadcasting.

It is possible to display numeric buttons, alphabet buttons, hiragana buttons like a keyboard in the data broadcasting display area. In this case, the viewer can input the necessary information for giving the tip such as the person to be tipped and the amount of the tip by selecting these buttons.

In addition to credit card payments, tipping can be done by QR code payment such as "LINE PAY (registered trademark)", "PayPay (registered trademark)", "Rakuten Pay (registered trademark)", "au Pay (registered trademark)", "Merupay (registered trademark)", and "d payment (registered trademark)", carrier payment of mobile phone companies, payment by virtual currency such as bitcoin (registered trademark) and other payment methods. The virtual currency also includes a dedicated currency that can be used in the social tipping management system 10 in this embodiment.

When performing QR code payment, for example, a QR code for QR code payment is displayed in the data broadcasting display area. The viewer pays by using a smartphone or the like to read the QR code displayed in the data broadcasting display area. Also, when paying with virtual currency, for example, a QR code for paying with virtual currency is displayed in the data broadcasting display area. When the viewer reads the displayed QR code using a smartphone or the like, a website for making payments in virtual currency is displayed via the Internet line, and payment is made by entering the necessary information.

In other words, tipping can be performed by at least one of credit card payment, QR code payment, carrier payment of mobile phone companies, and virtual currency payment in the social tipping management system 10 according to the present embodiment.

When the viewer gives the tip based on the information displayed in the data broadcasting display area, the management server 1 receives the tip data via the Internet line and determines the amount of the tip to be distributed to the program performers.

In this embodiment, the management server 1 receives the tip data including at least the person to be tipped and the amount of the tip when the viewer gives the tip using the interactive function of the data broadcasting. The management server 1 receives the tip data from a plurality of viewers, aggregates the amount of the tip for each person to be tipped, and determines the amount to be distributed.

It should be noted that the tip may also be distributed to people or organizations other than the program performers, or other related parties. For example, if the program is a sports game program and the program performers are athletes, tips may be distributed not only to the athletes but also to the teams to which the athletes belong. In addition, if the program performers are entertainers, the tip may be distributed to the entertainment agency, or may be distributed to the television station that broadcasts the program or the program advertisers (sponsors).

The tip data received by the management server 1 may include information about the viewer who has given the tip. The information about the viewer who has given the tip includes, for example, at least one of the viewer's name, age, address, telephone number, and e-mail address. For example, a field for inputting information about the viewer who gives the tip is provided in the data broadcasting display area of the television 2, and each time the viewer gives the tip, information such as the name of the viewer can be input. In addition, it may be possible to register information about viewers in advance in order to use the social tipping management system 10 of the present invention. For example, the social tipping management system 10 comprises a storage server, and stores information about viewers who give the tip in the storage server. In this case, viewers do not need to input their own information each time they give the tip, which improves convenience.

The management server 1 may provide the program performer who has received the tip with information about the viewer included in the tip data so that the program performer who has received the tip can thank the viewer for the tip. Information about the viewer who has given the tip can be provided via the Internet line, for example, by e-mail. In this case, the program performer who has received the tip can thank the viewer who has given the tip by e-mail or telephone, or send a letter or gift to the address of the viewer. In this way, the program performers who receive the tip can thank the viewers for their support, thereby stimulating the viewers to give the tip and enlivening the program.

According to the social tipping management system 10 in the present embodiment, when the viewer is watching a program displayed on the television 2, the viewer can easily give the tip to the program performers by using the interactive function of the data broadcasting. In other words, there is no need to access a Web site or download an application for giving the tip to a smartphone or other device, and the remote control 3A of the television 2 can be used to easily give the tip. If the number of viewers who give the tip by using the social tipping management system 10 in this embodiment increases, the television program will be more exciting, the viewer rating will increase, and the effect of the advertisement displayed during the program broadcasting will improve, which is also beneficial to the advertisers of the program.

If a screen for giving the tip is displayed on the program image of the digital television broadcasting, viewers who are not interested in giving the tip may feel annoyed. However, since the data broadcasting is displayed separately from the program image and information for giving the tip is included in the content of the data broadcasting, viewers who are not interested in giving the tip do not feel annoyed.

Second Embodiment

In the social tipping management system 10 according to the first embodiment, the viewer can tip the program performer by operating the terminal 3 for operating the television 2.

On the other hand, in the social tipping management system 10 according to the second embodiment, the viewer can tip the program performer by operating a smartphone or the like.

In the social tipping management system 10 according to the second embodiment as well, when the viewer presses the d button 39 on the remote control 3A to display the data broadcasting on the television 2 while the digital television broadcasting program is being displayed on the television 2, the content of the displayed data broadcasting is configured to include information for giving the tip. In this embodiment, the "information for giving the tip" includes a QR code for accessing the input screen for giving the tip. In other words, the data broadcasting creation server 4 creates data broadcasting content that includes a QR code for accessing the input screen for giving the tip.

Figure 5:
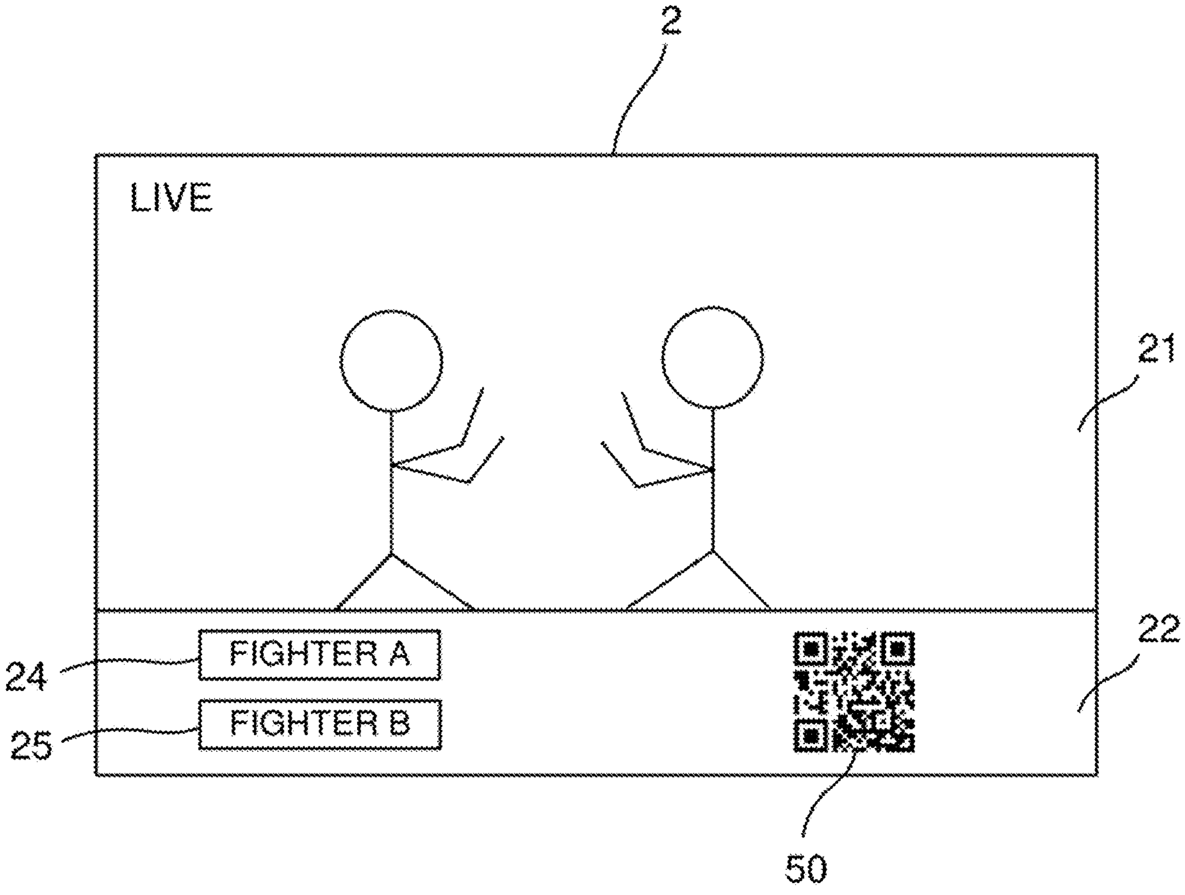
FIG. 5 is a diagram showing an example of the display screen when a QR code (registered trademark) for giving the tip is displayed in the data broadcasting display area while the digital television broadcasting program is being displayed on the television.

When the viewer presses, for example, the d button 39 on the remote control 3A to display the data broadcasting on the television 2 while viewing the digital television broadcasting program, a QR code 50 for accessing the input screen for giving the tip is displayed in the data broadcasting display area, as shown in FIG. 5. The contents of the data broadcasting including the QR code 50 for accessing the input screen for giving the tip may be automatically displayed on the television 2 at least once during the broadcast of the program.

When the viewer reads the QR code 50 using a smartphone or other device, he/she can access the website for tipping. The viewer can give the tip by inputting the person to be tipped, the amount of the tip, the information of the credit card to be used when paying the tip, etc., according to the guidance of the accessed website.

The QR code 50 displayed in the data broadcasting display area of the television 2 may be read using a dedicated application that enables the viewer to give the tip. The viewer downloads a dedicated application for giving the tip to a smartphone or other device, and uses the application to read the QR code 50. The user can access the input screen for tipping by reading the QR code 50, and can give the tip by selecting or inputting information such as the person to be tipped, the amount of the tip, and the credit card information to be used to pay the tip on the input screen.

The dedicated application that allows users to give the tip may allow users to check the program schedule and program information of the digital television broadcasting. For example, it may be possible to check more detailed program information than that which can be checked on the television 2, such as information on the program performers, behind-the-scenes stories of the program performers, and the official websites and blogs of the program performers.

With the dedicated application that allows users to give the tip, users may be able to check information on upcoming programs in which the program performers are scheduled to appear, or information on programs in which the program performers have appeared in the past.

When the viewer gives the tip, the amount of the tip received by the program performers may be immediately reflected in the dedicated application for tipping. That is, when the viewer gives the tip using the dedicated application for tipping, the program performer receiving the tip may immediately check the amount of the tip using the same kind of application.

Even with the social tipping management system 10 according to the second embodiment, the viewer can easily give the tip to the program performers while watching the digital television broadcasting program. That is, when the data broadcasting is displayed by pressing the d button 39 on the remote control 3A while watching the program, the QR code 50 for giving the tip is displayed, so the viewer can easily give the tip by reading the QR code 50 using a smartphone or other device.

Third Embodiment

The social tipping management system 10 according to the third embodiment activates tipping by viewers by giving points to viewers who have tipped. That is, the viewer is given points according to the tip.

The points given to viewers according to their tipping are, for example, "acquired tipping points" and "permanent tipping points". Both the acquired tipping points and the permanent tipping points are points given to viewers who have made the tipping, and are managed by the management server 1. For example, the management server 1 manages the name of the viewer or an ID for identifying the viewer, and the given points. Here, it is assumed that the points given to viewers in response to their tipping are "acquired tipping points" and "permanent tipping points", but the points given to viewers can be either "acquired tipping points" or "permanent tipping points", or they can be different points from either of these.

The acquired tipping points are points that can be used by viewers, as described later. When the viewer uses the acquired tipping points, the number of acquired tipping points he or she owns are reduced by the amount used. On the other hand, the permanent tipping points are points that are only given and do not decrease. These points, for example, may be displayed in the data broadcasting display area, may be checked when the viewer accesses a predetermined website and logs in, or may be checked with a predetermined application that is downloaded and used on a smartphone or other device.

The number of the acquired tipping points and the permanent tipping points given to the viewer may be based on the amount of the tip, or it may be based on the number of times the viewer has given the tip regardless of the amount of the tip, such as one point per one tipping.

The acquired tipping points given to viewers can be exchanged for various products, for example. The exchange of the acquired tipping points for products can be conducted, for example, on a predetermined website or application. That is, a gift catalog listing a plurality of products with the number of points required for exchange is prepared on a predetermined website or application. The products in the gift catalog may be provided, for example, by a program advertiser (sponsor) who provides advertisements for programs in which tips are given, or may be provided by the television station that broadcasts the programs. Note that a booklet of the gift catalog may be prepared separately from the electronic version of the gift catalog that can be viewed on the website or application.

Viewers can exchange for desired products based on the earned tipping points. The exchanged product is sent to the home of the viewer who exchanged the tipping points for the product. However, it may also be sent as a gift to another person. When the viewer exchanges the acquired tipping points for the product, the number of points required for the exchange is subtracted from the acquired tipping points.

The items that can be exchanged for the acquired tipping points are not limited to items in gift catalogs. For example, the program performers' handwritten letters, the program performers' possessions, the program performers' goods or the like may be prepared as items that can be exchanged for the acquired tipping points. The program performers' goods are, for example, key chains, stuffed animals, alarm clocks, handkerchiefs, towels, and the like. As an item that can be exchanged for the acquired tipping points, a special item that cannot be obtained elsewhere may be prepared. Also, what can be exchanged for the acquired tipping points may be the right to talk with program performers using a telephone or video call application, or the right to meet program performers.

The acquired tipping points given to viewers may be transferable to others. When the acquired tipping points are transferred to another person, the number of transferred points is subtracted from the acquired tipping points.

The permanent tipping points are points given to viewers, but they may also be given to the program performers who receive the tip. In other words, the program performer acquires the permanent tipping points each time the tip is given to himself/herself.

Figure 6:
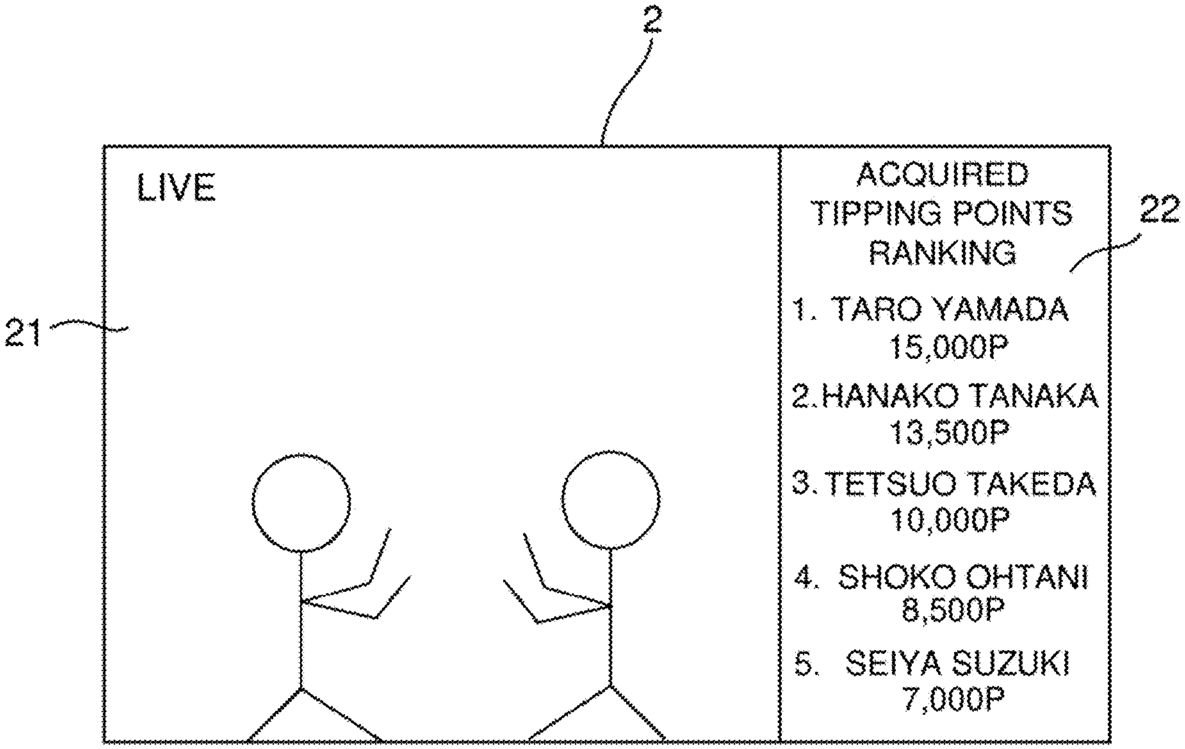
FIG. 6 is a diagram showing an example of the display screen when a ranking of acquired tipping points is displayed in the data broadcasting display area while the digital television broadcasting program is being displayed on the television.

The acquired tipping points and the permanent tipping points given to viewers may be displayed in a ranking format in descending order of the number of points. For example, they may be displayed on the data broadcasting screen as shown in FIG. 6, or they may be checked when the viewer accesses and logs in to a predetermined website, or they may be checked with a predetermined application that is downloaded and used on the smartphone or other device. The name of the viewer displayed in the ranking may be his/her real name or an ID or pen name unique to that viewer. The permanent tipping points given to the program's performers may also be displayed in a ranking format.

The acquired tipping points and the permanent tipping points may be aggregated for each digital television broadcasting program. For example, a predetermined period of time (e.g., two to three weeks) may be set as one period, and for each period of each program, the acquired tipping points and the permanent tipping points acquired by the viewer may be displayed in a ranking format in descending order of the number of points.

A period during which viewers can give the tip may be set in advance. For example, in a serial drama program, the first episode to the third episode may be assigned as the first course, and the fourth episode to the sixth episode may be assigned as the second course, and in each course, the period during which the viewer can give the tip may be predetermined.

Viewers may be able to apply for gifts according to the acquired tipping points or the permanent tipping points earned by viewers. The gifts are prepared by, for example, a television station. The gifts may include goods exclusive to the program. Application for gifts may be made based on the acquired tipping points or the permanent tipping points acquired by the viewer during a predetermined period. The person (e.g., the top 20) with the highest number of the acquired tipping points or the permanent tipping points earned by the viewer during the predetermined period may be automatically awarded the gift. In such a case, for example, different gifts may be given to the top 1-2 viewers with the highest number of points, the top 3-5 viewers, the top 6-10 viewers, and the top 11-20 viewers.

The points given to viewers according to their tipping are not limited to the above-mentioned "acquired tipping points" or "permanent tipping points". For example, existing points such as T points (registered trademark), d points (registered trademark), Ponta points, and WAON points may be given to viewers.

According to the social tipping management system 10 in the third embodiment, when the viewer gives the tip, points are given to the viewer according to the tipping, so it is possible to encourage tipping by viewers who want to earn points.

In particular, the points given to viewers by giving the tip can be exchanged for products provided by the program advertiser who provides an advertisement for the program in which the tip is given, so that the operator of the social tipping management system 10 can no longer need to prepare products. When the point system stimulates the tipping to program performers, the program becomes more exciting, the viewer rating increases, and the effectiveness of the advertisements displayed during the program improves, making it worthwhile for the program advertisers to provide products. In addition, it is possible to increase the name recognition of the products by using the products of the program advertiser as the products that can be exchanged for points.

Fourth Embodiment

In the social tipping management system 10 according to the fourth embodiment, when the viewer gives the tip, the program advertiser who provides the advertisement for the program in which the tip is given provides money according to the amount of the tip given by the viewer.

The management server 1 calculates the sum of the amount of money to be distributed to the program performers by calculating the total of the amount tipped by viewers and the amount of money provided by the program advertiser in proportion to the amount of money provided by viewers. The amount of money to be provided by the program advertiser in proportion to the amount tipped by the viewer can be determined arbitrarily; for example, it can be the same as the amount tipped by the viewer, or it can be a predetermined percentage of the amount tipped by the viewer, for example, half the amount. If the amount of money to be provided by the program advertiser in proportion to the amount tipped by the viewer is the same as the amount tipped by the viewer, for example, if the viewer provides 1,000 yen, the program advertiser will also provide 1,000 yen. In this case, the program performer will receive 1000 yen provided by the viewer and 1000 yen provided by the program advertiser. However, the program performers may be given the amount of money after subtracting the system usage fee for the social tipping management system 10.

According to the social tipping management system 10 of the present embodiment, the program performers can receive not only the amount tipped by the viewers but also the money provided by the program advertisers, so that they can receive more money. Therefore, it is possible for the viewers to support the program performers more effectively. This is expected to have the effect of increasing the excitement of the program by viewers who support the program performers, thereby improving the viewer rating, making it worthwhile for program advertisers who advertise in the program to provide money in proportion to the amount tipped by viewers.

Fifth Embodiment

Figure 7:
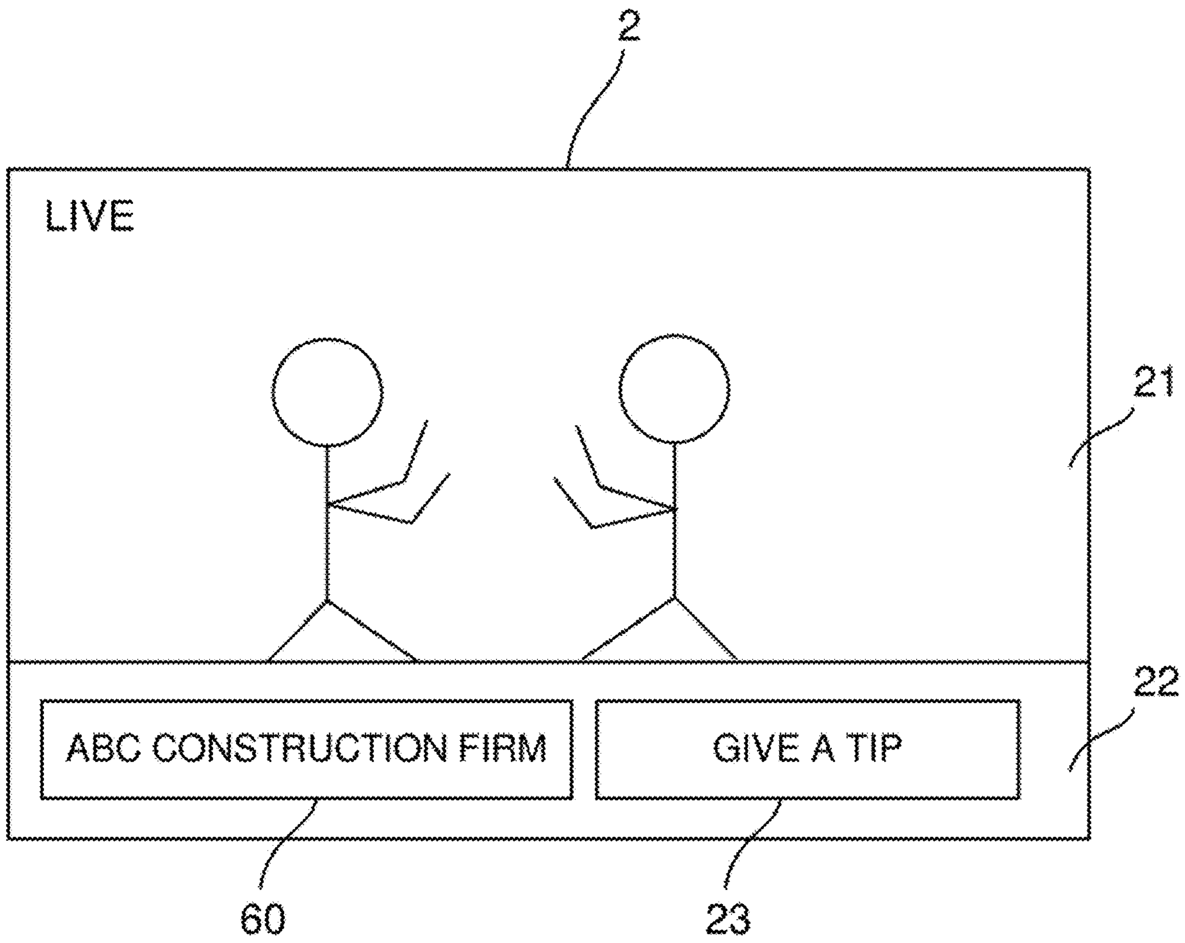
FIG. 7 is a diagram showing an example of the display screen when an advertisement of a data broadcasting advertiser is displayed in the data broadcasting display area while the digital television broadcasting program is being displayed on the television.

In the social tipping management system 10 according to the fifth embodiment, an advertisement 60 of the data broadcasting advertiser is displayed on the data broadcasting screen including information for giving the tip as shown in FIG. 7. Here, the advertiser whose advertisement is displayed on the data broadcasting screen is called a "data broadcasting advertiser". When the data broadcasting is called two-way communication broadcasting, a "data broadcasting advertiser" can be called a "two-way communication broadcasting advertiser." The advertiser 60 of the advertisement displayed on the data broadcasting screen may be the same as the advertiser of the advertisement (program advertiser) displayed during the digital television broadcasting program, or may be different. Further, the advertisement 60 displayed on the data broadcasting screen is not limited to the advertisement 60 of one data broadcasting advertiser, and may be the advertisements 60 of a plurality of data broadcasting advertisers.

In the social tipping management system 10 according to the fifth embodiment, when the viewer gives the tip, the data broadcasting advertiser provides money according to the amount of the tip by the viewer.

The management server 1 determines the amount of money to be distributed to the program performers by calculating the total of the amount tipped by viewers and the amount of money provided by the data broadcasting advertiser in proportion to the amount of money tipped by viewers. The amount of money to be provided by the data broadcasting advertiser in proportion to the amount of money tipped by the viewer can be determined arbitrarily; for example, it can be the same as the amount tipped by the viewer, or it can be a predetermined percentage of the amount tipped by the viewer, such as half the amount. If the amount of money to be provided by the data broadcasting advertiser in proportion to the amount tipped by the viewer is the same as the amount tipped by the viewer, for example, if the viewer provides 1,000 yen, the data broadcasting advertiser will also provide 1,000 yen. In this case, the program performer can obtain 1,000 yen provided by the viewer and 1,000 yen provided by the data broadcasting advertiser. However, the program performer may be given the amount of money after subtracting the system usage fee for the social tipping management system 10.

It is possible to set a lower advertising fee for advertisements displayed on the data broadcasting screen compared to advertisements for digital television broadcasting programs. Therefore, it is easier for data broadcasting advertisers to place advertisements casually compared to placing advertisements in digital television broadcasting programs, and considering the effectiveness of advertisements, it is worthwhile to provide money according to the amount of money tipped by viewers.

According to the social tipping management system 10 according to the present embodiment, program performers can receive more money, so that viewers can more effectively support the program performers.

The present invention is not limited to the above embodiments, and various applications and modifications can be made within the scope of the present invention. For example, the characteristic parts in each of the above-described embodiments can be combined as appropriate.

For example, the features of the social tipping management system 10 according to the fourth embodiment and the features of the social tipping management system 10 according to the fifth embodiment may be combined. That is, when the viewer gives the tip, the program advertiser who provides advertisements for the program in which the tip is given and the data broadcasting advertiser may provide money according to the amount of the tip given by the viewer.

The social tipping management system in this application is as follows.

<1>. A social tipping management system for allowing viewers to give a tip to program performers in digital television broadcasting, wherein data broadcasting content to be displayed on a television when a digital television broadcasting program is displayed on the television includes information for the viewer to give the tip;

the social tipping management system comprising:

a data broadcasting creation server for creating the data broadcasting content including information for giving the tip; and a management server for receiving tip data via an Internet line when the viewer gives the tip based on the information for giving the tip included in the data broadcasting content, and determining the amount of money to be distributed to the program performer.

<2>. The social tipping management system according to <1>, wherein the data broadcasting content including the information for giving the tip is automatically displayed on the television at least once during the broadcast of the digital television broadcasting program.

<3>. The social tipping management system according to <1> or <2>, wherein fields for selecting or inputting at least a person to be tipped and the amount of the tip are displayed in the data broadcasting display area; and wherein the management server receives the tip data including the person to be tipped and the amount of the tip when the viewer gives the tip using the interactive function of the data broadcasting.

<4>. The social tipping management system according to <1> or <2>, wherein the information for giving the tip includes a QR code for accessing an input screen for tipping.

<5>. The social tipping management system according to any one of <1> to <4>, wherein a program advertiser who provides advertising for the program in which the tip is given provides money in proportion to the amount of the tip given by the viewer when the viewer gives the tip; and wherein the management server calculates the sum of the amount of the tip given by the viewer and the amount of money provided by the program advertiser in proportion to the amount of the tip given by the viewer, and determines the amount of money to be distributed to the program performer.

<6>. The social tipping management system according to any one of <1> to <4>, wherein an advertisement of a data broadcasting advertiser is displayed on the screen of the data broadcasting containing the information for giving the tip;

wherein the data broadcasting advertiser provides money in proportion to the amount of the tip given by the viewer when the viewer gives the tip; and wherein the management server calculates the sum of the amount of the tip given by the viewer and the amount of money provided by the data broadcasting advertiser in proportion to the amount of the tip given by the viewer, and determines the amount of money to be distributed to the program performer.

<7>. The social tipping management system according to any one of <1> to <6>, wherein the tip data includes information about the viewer who has given the tip; and wherein the management server provides the information about the viewer included in the tip data to the program performer who receives the tip.

<8>. The social tipping management system according to any one of <1> to <7>, wherein the management server manages points given to the viewer who has given the tip according to the tipping by the viewer.

<9>. The social tipping management system according to <8>, wherein the points given to the viewer by giving the tip can be exchanged for products provided by a program advertiser who provides advertising for the program in which the tip is given.

<10>. The social tipping management system according to any one of <[1] to <9>, wherein the tip can be given by at least one of credit card payment, QR code payment, carrier payment of mobile phone companies, and virtual currency payment.

DESCRIPTION OF SYMBOLS

1 Management server
2 Television
3 Terminal
4 Data broadcasting creation server
3A Remote control
10 Social tipping management system
21 Video of digital television broadcasting programs
39 Contents of data broadcasting
39 d button on the remote control
50 QR code
60 Advertising of data broadcasting advertisers

The invention claimed is:

1. A social tipping management system for allowing viewers to give a tip to program performers of digital television broadcasting, wherein data broadcasting content to be transmitted together with a program content and displayed on a television when a digital television broadcasting program is displayed on the television includes information for the viewer for selecting a program performer to be tipped from a plurality of program performers who appears in the digital television broadcast program to give the tip to the selected program performer;

the social tipping management system comprising:

a data broadcasting creation server for creating the data broadcasting content including the information for giving the tip selecting the program performer to be tipped to give the tip to the selected program performer; and a management server for receiving tip data via an Internet line when the viewer gives the tip based on the information for giving the tip included in the data broadcasting content, and determining the amount of money to be distributed to each of the selected program performer in the plurality of program performers, wherein the management server gives points to all viewers who have given the tip to the selected program performer without requiring an operation by the selected program performer, each of the all viewers being the viewer, and manages the point given to the viewer so that the points given to the viewer can be exchanged for products provided by a program advertiser and selected by the viewer, the program advertiser providing advertising for the program in which the tip is given.

2. The social tipping management system according to claim 1, wherein the data broadcasting content including the information for giving the tip is automatically displayed on the television at least once during the broadcast of the digital television broadcasting program.

3. The social tipping management system according to claim 1, wherein fields for selecting or inputting at least a person to be tipped and the amount of the tip are displayed in the data broadcasting display area; and wherein the management server receives the tip data including the person to be tipped and the amount of the tip when the viewer gives the tip using the interactive function of the data broadcasting.

4. The social tipping management system according to claim 1, wherein the information for giving the tip includes a QR code for accessing an input screen for tipping.

5. The social tipping management system according to claim 1, wherein a program advertiser who provides advertising for the program in which the tip is given provides money in proportion to the amount of the tip given by the viewer when the viewer gives the tip; and wherein the management server calculates the sum of the amount of the tip given by the viewer and the amount of money provided by the program advertiser in proportion to the amount of the tip given by the viewer, and determines the amount of money to be distributed to the program performer.

6. The social tipping management system according to claim 1, wherein an advertisement of a data broadcasting advertiser is displayed on the screen of the data broadcasting containing the information for giving the tip;

wherein the data broadcasting advertiser provides money in proportion to the amount of the tip given by the viewer when the viewer gives the tip; and wherein the management server calculates the sum of the amount of the tip given by the viewer and the amount of money provided by the data broadcasting advertiser in proportion to the amount of the tip given by the viewer, and determines the amount of money to be distributed to the program performer.

7. The social tipping management system according to claim 1, wherein the tip data includes information about the viewer who has given the tip; and wherein the management server provides the information about the viewer included in the tip data to the program performer who receives the tip.

8. The social tipping management system according to according to claim 1, wherein the tip can be given by at least one of credit card payment, QR code payment, carrier payment of mobile phone companies, and virtual currency payment.

* * * * *